April 18, 1944.   G. DEAKIN   2,346,912
CLUTCH FOR TELECOMMUNICATION SELECTOR SWITCHES
Filed July 15, 1942
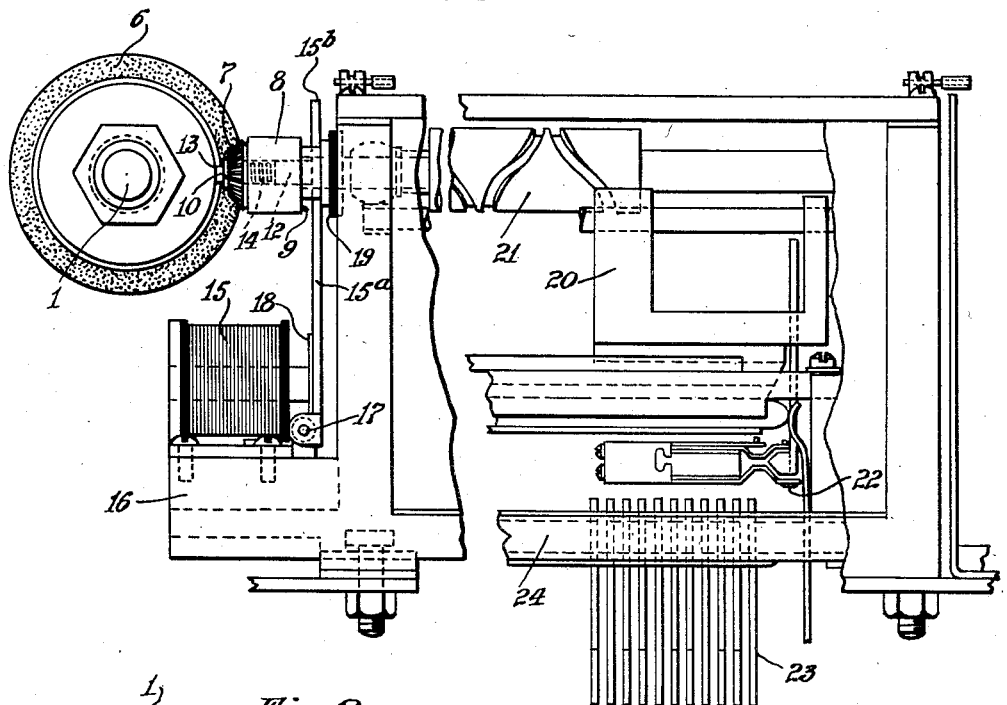
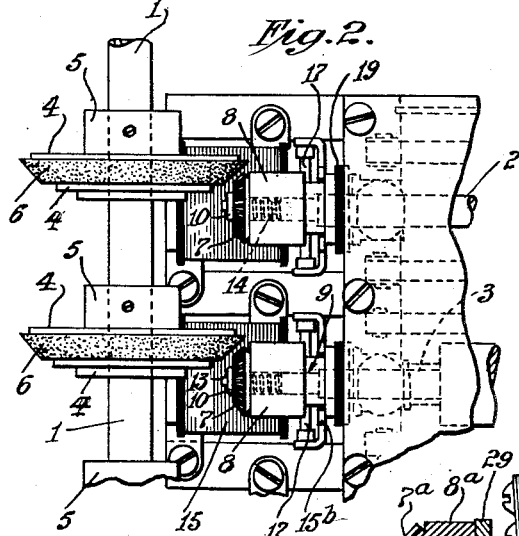
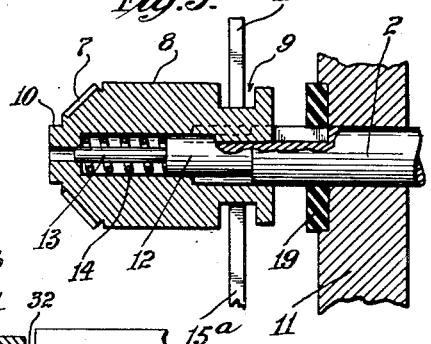
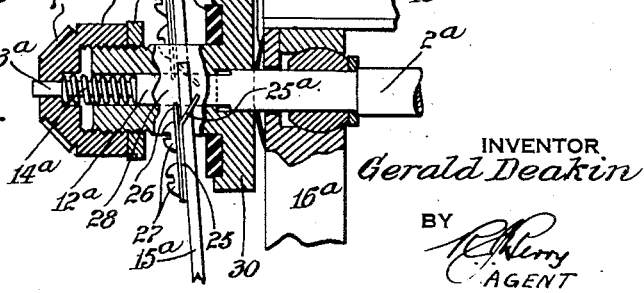
INVENTOR
Gerald Deakin
BY
AGENT Patented Apr. 18, 1944

2,346,912

UNITED STATES PATENT OFFICE 2,346,912

CLUTCH FOR TELECOMMUNICATION SELECTOR SWITCHES

Gerald Deakin, New York, N. Y., assignor to International Standard Electric Corporation, New York, N. Y., a corporation of Delaware Application July 15, 1942, Serial No. 451,019

11 Claims. (Cl. 179—27.5)

This invention relates to new and useful improvements in selector switches for automatic telephone and telecommunication systems, and more particularly to improvements in clutches for power driven selectors.

In power driven selectors the normally stationary selector shafts are operated by selectively coupling them with a constantly rotating driving shaft. Since a large number of selector shafts must be arranged to be coupled to the same power shaft, the latter is relatively long and it is difficult properly to align it so that the same torque be applied to each selector shaft.

One object of the present invention is to provide a selector shaft clutch which makes the proper alignment of the driving with the driven shafts an easy and simple matter.

With this object in view, I provide a clutch between the power shaft and the selector shaft which is self-adjusting and variable so as to accommodate the coupling of each selector shaft to the driving shaft. The clutch between the two shafts comprises a toothed or ribbed face of relatively hard material and a face of semi-hard material whereby after a short period of use the ribbed face of hard material will itself cut or impress indentations in the opposite face of semi-hard material and thus insure proper engagement between the two clutch faces.

In accordance with the preferred embodiment of the invention, the selector shaft terminates in a spring pressed clutch member of hard material provided with a ribbed or toothed face. The driving shaft is provided with a plurality of clutch disks, one for each clutch, and these or the portions thereof which cooperate with the toothed faces of the spring-pressed clutch members are formed of leather, rubber or some other semi-hard substance which is to some extent deformable when pressed against the toothed face of the other clutch member. After a short time each spring-pressed clutch face will cut or impress its own gear teeth in the cooperating driving disk so that even with a poorly aligned driving shaft, uniform driving torque will be insured for each selector shaft.

These and other features of the invention will more fully appear from the following detailed description of a detailed embodiment thereof and the drawing in which Fig. 1 is an end view of the driving shaft with a cooperating selector shaft;

Fig. 2 is a side elevation of the driving shaft with a plurality of cooperating selector shafts;

Fig. 3 is a cross-section on an enlarged scale of a clutch in the actuated position; and Fig. 4 is a view like Fig. 3 illustrating a modification.

In the drawing 1 is a driving shaft driven from a suitable central source of power and common to a plurality of selector shafts two of which, 2 and 3, are shown in Fig. 2 running transversely to the driving shaft 1. In the so-called rotary power driven selectors, the driving shaft 1 is a vertical shaft and the selector shafts 2 and 3 run horizontally.

For each selector shaft the driving shaft 1 is provided with a driving disk 6 which is mounted on the shaft 1 in any suitable manner. In the embodiment shown the disk 6 is clamped between two metal washers 4 one of which at least is attached to a collar 5 secured by a set screw to the shaft 1. Each disk 6 is formed with a bevelled driving surface and is made of rubber, leather or other semi-hard deformable material. When the deformable bevelled surface of a driving disk 6 is engaged by a bevelled ribbed surface 7 forming part of the clutch mechanism of the associated selector shaft, then the teeth of the clutch face 7 will form their own driving gear in the bevelled edge of the disk 6 which, after operation for a certain length of time, will become set into the surface.

The bevelled ribbed face 7 of the driven clutch member is formed at the end of a cylinder or sleeve 8 which is preferably formed of a plastic molding. Near the other end of the cylinder a relatively wide groove 9 is formed. The cylinder 8 extends at 10 slightly beyond the bevelled face 7. The selector shaft 2 is carried in a bearing in the selector frame 11 and the clutch cylinder 8 is keyed to and longitudinally slidable on the end of the shaft 2 projecting beyond the frame 11. The projecting end of the shaft is stepped down as indicated at 12 and 13. A coiled spring 14 seated on the reduced end 13 of the shaft in an enlarged section of the bore of the cylinder 8, tends to press the clutch sleeve 8 towards the free end of the shaft and thus into engagement with the bevelled surface of the driving disk 6. This tendency is, however, overcome by an armature 15a of a clutch magnet 15.

The magnet 15 is mounted on a bracket 16 of the selector frame 1. The armature 15a is pivoted at 17 to the bracket 16 and when the magnet is de-energized is pressed by means of a spring 18 away from the magnet 15. The free end of armature 15a is forked as indicated at 15b the forked ends being located in the wide groove 9 in the cylinder 8. The thickness of the forked ends is considerably less than the width of the groove 9. The spring 18 is stronger than the spring 14 and will press the clutch sleeve 8 against a resilient seat 19, of rubber or other suitable material inset into frame 1. However, when the magnet 15 becomes energized, which happens when the particular selector to which the magnet is individual is selected for operation, then it will attract its armature so that the forked end 15b moves to the left-hand side of the groove 9 and the spring 14 may now force the clutch sleeve 8 to the left so that the toothed face 7 will engage the bevelled edge of disk 6 and the sharp ribs formed therein will deform this surface. In this position as shown in Fig. 3, the forked end 15b will not make contact with the clutch sleeve 8, leaving the latter free to rotate.

The reduced end 12, 13 of the shaft 2 extends into the bore of the sleeve 8 when the latter is in its engaged position and thus acts as an outboard bearing which prevents the sleeve 8 from wobbling.

It will be seen from the above that the clutches of the individual selector shafts will accommodate themselves to inaccuracies in the positioning of the driving shaft 1 and thus insure uniform torque for driving the selector shafts.

In the embodiment shown in Fig. 4, the forked ends 15b of the armature 15a are equipped with flat springs 25, having bent out ends 25a, secured thereto by screws 27. A back-stop 26 is clamped between the heads of the screws 27 and the spring 25 against which the free bent-out ends 25a of the springs 25 may be pushed.

In this embodiment the cone 8a is of molded plastic having a ribbed driven surface 7a. The cone is internally screw-threaded and screws onto a screw-threaded hollow stud 28 through which projects the end 12a of shaft 2a. The cone 8a is secured in position by a lock nut 29. The hollow stud projects from a hub 30, the assembly being free to slide on the shaft 12a which is flattened on two sides. As in the previously described embodiment, a spring 14a is provided tending to press the cone 8a and the attached stud 28 into engagement with the driving disk 6. A semi-hard rubber washer 31 is seated on the hub 30 and is preferably ribbed radially. A spring spider washer 32 is provided between the back of hub 30 and the frame 16a to absorb shocks when the hub and associated cone are forced against the frame by the magnet armature 15a.

When the magnet attracts the armature 15a against spring tension, the cone 8a will be forced by the spring 14a along the shaft 12a, 13a into engagement with the constantly rotating driving disk 6. During rotation of the cone 8a no portion of the cone assembly shown in Fig. 4 is in contact with the armature 15a, 15b. When the magnet becomes de-energized and releases its armature, spring pressure will force the latter to engage with its forked end 15b, the hub 30. The hub 30, stud 28 and cone 8a will be moved to the right and the hub pressed against the frame 16a flattening the shock absorbing washer 32. The contact between the armature and the hub 30 is through the free ends 25a of the springs 25 which engage the rubber washer 31. There is thus a non-slipping contact between the armature and the hub. When the hub 30 makes contact with the frame 16a, then the pressure of the spring 18 driving the armature overcomes the tension of the spring ends 25a which, therefore, will be straightened out against the back-stops 26. The straightening of the springs causes the rotation of hub 30 and, therefore, of the shaft 2a in the opposite direction from the direction in which it had been rotating, the hub 30 slipping on the washer 32. The shaft will thus be forced back a predetermined distance after the completion of the selecting operation and upon the uncoupling of the driven and selector shafts to compensate for the time required fully to de-energize the clutch magnet 15 and stop rotation. The shaft 2a is turned back an angular distance which it had travelled during the de-energization of the clutch magnet 15 and the return movement of the clutch mechanism. Thus the hunting operation may proceed at a much higher speed than would be possible without such correction. A force back of 5° would permit a selector hunting operation of 60 terminals per second.

Obviously, other arrangements than the one here illustrated may be adopted to insure backward rotation of the shaft when the clutch is returned to its normal position and uncouples the driven and selector shafts.

The invention is applicable to a wide variety of power driven telecommunication selectors, the one indicated in the drawing being of the type disclosed in my copending application Serial No. 433,315. As herein shown, a carriage 20 causes brushes such as 22 to wipe over sets of terminals 23 projecting through a wall 24 of the selector frame 1. A shoe on the brush carriage 20 engages in a continuous helical groove formed in a cylinder 21 mounted on the shaft 2, the rotation of which thus moves the brush carriage back and forth over the terminal bank.

It will be noted that the construction described permits easy replacement or substitution of the clutch sleeves 8, 8a and of the spring 14. Thus slight inaccuracies in the alignment of shaft 1 or in the relative positions of the shafts 1 and 2 may be compensated for without dismantling the selector assembly, by the use of a sleeve 8 of slightly longer or shorter length where necessary. In the embodiment illustrated in Fig. 4, an adjustment may be made in a very simple and effective manner by screwing the clutch cone 8a onto the stub 28 to a greater or lesser extent and locking it in position by means of the locking nut 29.

What I claim is:

1. In a telecommunication selector switch, a terminal bank, a set of wipers cooperating therewith, a continuously driven shaft, a rotatable selector shaft mounted transversely of said continuously driven shaft for moving said wipers over said terminal bank, a disk mounted upon said continuously driven shaft comprising a bevelled face, a cylindrical sleeve slidably mounted on said selector shaft, a face on said sleeve in cooperative relationship with the bevelled face of said disk, at least one of said faces being composed of a semi-hard material, and a coil spring within said sleeve and encircling said selector shaft for pressing said faces together.

2. A telecommunication selector switch according to claim 1 wherein the free end of said selector shaft projects through the end of said sleeve adjacent said continuously driven shaft to form an outboard bearing for said sleeve in its position of engagement with the bevelled face of said disk.

3. In a telecommunication selector switch assembly, banks of terminals, a plurality of sets of wipers cooperating therewith, a continuously rotating driving shaft, a transverse rotatable selector shaft for each set of wipers, a plurality of disks on said driving shaft, one for each of said rotatable shafts, a clutch for coupling each said rotatable selector shaft to said driving shaft comprising a sleeve slidable on said rotatable selector shaft, a ribbed bevelled face on said sleeve, and means for pressing said bevelled face against the edge of said disk.

4. In a telecommunication selector switch assembly, banks of terminals, a plurality of sets of wipers cooperating therewith, a rotatable shaft for each set of wipers, a continuously rotating driving shaft, a plurality of disks on said driving shaft, one for each of said rotatable shafts, a clutch member for coupling each rotatable shaft to its disk, a magnet for operating each clutch member in one sense, a spring for operating each clutch member in the opposite sense, and a coupling between each clutch member and disk comprising a bevelled ribbed face and a cooperating bevelled face composed of a semi-hard material deformable by said ribbed face.

5. In a telecommunication selector switch assembly, banks of terminals, a plurality of sets of wipers cooperating therewith, a rotatable selector shaft for each set of wipers, a clutch member for each shaft longitudinally slidable thereon, a magnet for each clutch member, a spring pressed armature for each magnet having a forked end engaging the associated clutch member and pressing it in one direction, a coiled spring within each clutch member pressing it in the opposite direction, a bevelled ribbed face for each clutch member, a driving shaft, a plurality of disks on said driving shaft, one for each of said selector shafts, and a bevelled face for each disk in cooperative relationship with the ribbed face of said clutch member.

6. A telecommunication selector switch assembly according to claim 5 wherein said disks are composed of a semi-hard material such as rubber.

7. In a telecommunication selector switch assembly, banks of terminals, a plurality of sets of wipers cooperating therewith, a rotatable selector shaft for each set of wipers, bearings for said shafts, a clutch for each shaft comprising a sleeve rotatable with but longitudinally slidable on an end thereof, a collar on each clutch sleeve, a magnet for each clutch, a spring pressed armature for each magnet having a forked end engaging the collar of the associated clutch sleeve and pressing it away from the end of the shaft on which it is mounted, a coiled spring within each clutch sleeve pressing it in the opposite direction, a bevelled ribbed face for each clutch sleeve, a continuously rotating driving shaft, a plurality of disks on said driving shaft, one for each of said clutches, and a bevelled rubber face for each disk in cooperative relationship with the ribbed face of the clutch sleeve so that when the two are pressed together the ribbed face will form its own driving gear in the rubber face.

8. In a telecommunication selector switch, a terminal bank, a set of wipers cooperating therewith, a continuously driven shaft, a rotatable selector shaft for moving said wipers over said terminal bank, a clutch for coupling and uncoupling said driven and selector shafts to cause rotation of said selector shaft by said driven shaft in one direction, and means operable upon each uncoupling of said shafts for rotating said selector shaft through a predetermined angle in the opposite direction.

9. In a telecommunication selector switch, a terminal bank, a set of wipers cooperating therewith, a continuously driven shaft, a rotatable selector shaft for moving said wipers over said terminal bank, a clutch for coupling and uncoupling said driven and selector shafts to cause rotation of said selector shaft by said driven shaft in one direction, a spring for causing the coupling operation of said clutch, a spring pressed magnet armature for causing the uncoupling operation of the clutch, and means controlled by said armature and operable upon each uncoupling of said shafts for rotating said selector shaft through a predetermined angle in the opposite direction.

10. In a telecommunication selector switch assembly, a bank of terminals, a set of wipers cooperating therewith, a rotatable selector shaft for said set of wipers, a power shaft, a clutch for coupling and uncoupling said shafts comprising a sleeve rotatable with but longitudinally slidable on the end of the selector shaft, a magnet for said clutch, a spring pressed armature for said magnet having a forked end for operating said clutch by moving said sleeve a certain distance to uncouple said shafts, and a flat spring attached to each forked end of the armature and having bent free ends engaging said sleeve to rotate it and the seelctor shaft to a predetermined extent after the uncoupling of the shafts.

11. In a telecommunication selector switch assembly, a bank of terminals, a set of wipers cooperating therewith, a rotatable selector shaft for said set of wipers, a clutch for said shaft comprising a sleeve rotatable with but longitudinally slidable on an end thereof, a hub on said clutch sleeve, a semi-hard surface for said hub, a magnet for said clutch, a spring pressed armature for said magnet having a forked end, a coiled spring within said clutch sleeve moving it in one direction, a bevelled ribbed face for said clutch sleeve, a continuously rotating driving shaft, a disk on said driving shaft, a bevelled rubber face for said disk in cooperative relationship with the ribbed face of the clutch sleeve so that when the two are pressed together by said coiled spring the selector shaft will be rotated in one direction and the ribbed face will form its own driving gear in the rubber face, and a flat spring attached to each forked end of the armature and having bent free ends engaging said semi-hard surface when pressed against it by the armature spring first to move the sleeve in the opposite direction and then to rotate it and the selector shaft to a predetermined extent in the opposite direction.

GERALD DEAKIN.